Figure 1:
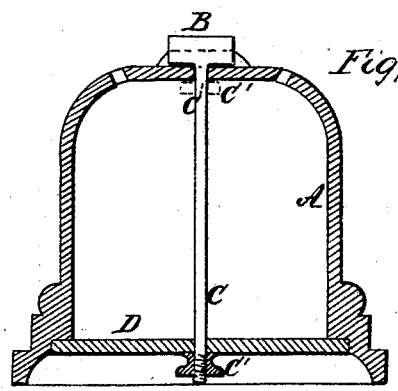
Figure 2:
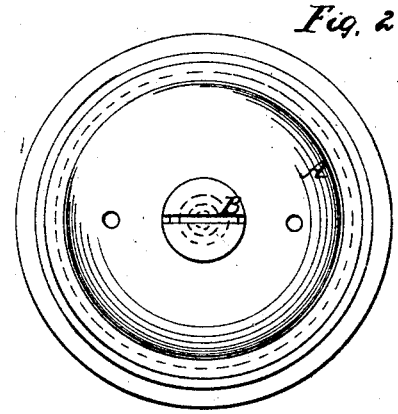

*Smith & Emery,*
*Twine Holder.*

N° 82,167. Patented Sep. 15, 1868.

Witnesses,
Fred W. Scott
B. H. Muehle

Inventor,
Henry Smith
James Emery

United States Patent Office.

HENRY SMITH AND JAMES EMERY, OF BUFFALO, NEW YORK.

Letters Patent No. 82,167, dated September 15, 1868.

IMPROVED TWINE-BOX.

*The Schedule referred to in these Letters Patent and making part of the same.*

TO ALL WHOM IT MAY CONCERN:

Be it known that we, HENRY SMITH, of Sheffield, England, and JAMES EMERY, of Bristol, England, both now residing in the city of Buffalo, county of Erie, and State of New York, have invented a certain new and useful Improvement in Twine-Box; and we do hereby declare that the following is a full and exact description thereof, reference being had to the accompanying drawings, making a part of this specification, in which—

Figure I is a vertical sectional elevation.

Figure II is a top plan view.

The nature of this invention consists—

First, in an adjustable and removable knife, attached to the outside of a twine-box by means of a screw-shank, which forms part of the knife, passes through the walls of the box, and is secured upon the opposite side by a screw-nut or set-screw.

Second, in extending the said screw-shank centrally through the hollow interior of the twine-box, and through the removable bottom thereof, as a means of fastening the bottom and knife to the twine-box by the same set-screw.

Letters of like name and kind refer to like parts in each of the figures.

A represents the main body of a twine-box, which may be round, square, oval, or of any other shape or design.

B represents a knife, which may be of any desirable length, and attached at any convenient point to the outside of the twine-box. This knife is provided with a shank, C, projecting at right angles from the back of the knife-blade, and carrying a screw-nut or set-screw, C', at its opposite end.

The knife-blade rests within a groove cut in the outside surface of the body of the twine-box, and the shank C extends through an opening made for that purpose. The screw-nut may be applied, as shown by red lines in Fig. I, upon the inner side of the body of the twine-box, and in that case serves the purpose of securing and holding only the knife in its proper position.

D represents a removable bottom, which is fitted into a recess formed in the lower edge of the body of the twine-box.

The shank C is extended downwardly through a central opening in the bottom, and by applying the set-screw or screw-nut C' to the projecting end of the shank, both the adjustable knife and the removable bottom of the box are secured to the main body by the same means, viz, the extended shank C and screw-nut C'.

We are well aware that knives have heretofore been connected with twine-boxes for the purpose of facilitating the cutting of the twine in a manner to prevent unnecessary waste thereof, but we do not believe that such knives or cutters have ever been adjusted to the body of the twine-box in the manner herein shown and described, and so that they may be readily removed to be sharpened.

What we claim as our invention, and desire to secure by Letters Patent, is—

1. The adjustable and removable knife B, having a screw-shank, C, and set-screw C', in combination with the twine-box A, substantially as described.

2. The extended screw-shank C and set-screw C', as a means of connecting and securing both the knife B and removable bottom D to the main body of the twine-box A, substantially as herein described.

HENRY SMITH,
JAMES EMERY.

Witnesses:
FRED. W. SCOTT,
B. H. MUEHLE.